US006202486B1

United States Patent
Kemp

(10) Patent No.: US 6,202,486 B1
(45) Date of Patent: Mar. 20, 2001

(54) ANALOG LIQUID LEVEL SENSOR

(75) Inventor: John W. Kemp, St. George (CA)

(73) Assignee: Imaging & Sensing Technology Corporation, Horseheads, NY (US)

( * ) Notice: Subject to any disclaimer, the term of this patent is extended or adjusted under 35 U.S.C. 154(b) by 0 days.

(21) Appl. No.: 09/164,962

(22) Filed: Oct. 1, 1998

(51) Int. Cl.[7] ................................................. G01F 23/22
(52) U.S. Cl. ................................................. 73/295; 73/292
(58) Field of Search ....................................... 73/292, 295

(56) References Cited

U.S. PATENT DOCUMENTS

| | | | | |
|---|---|---|---|---|
| 3,279,252 | * | 10/1966 | Barlow ................................... | 73/295 |
| 3,653,262 | * | 4/1972 | Ehrenfried et al. ..................... | 73/292 |
| 4,590,797 | * | 5/1986 | Beaubatie et al. ..................... | 73/295 |
| 4,805,454 | * | 2/1989 | Le Vert ................................... | 73/295 |

FOREIGN PATENT DOCUMENTS

| | | | | |
|---|---|---|---|---|
| 622247 | * | 5/1927 | (FR) ....................................... | 73/295 |
| 271708 | * | 6/1927 | (GB) ....................................... | 73/295 |
| 158522 | * | 9/1982 | (JP) ....................................... | 73/295 |
| 402102419 | * | 4/1990 | (JP) ....................................... | 73/292 |
| 1672228 | * | 8/1991 | (SU) ....................................... | 73/295 |

* cited by examiner

Primary Examiner—Hezron Williams
Assistant Examiner—W. Morris Worth
(74) Attorney, Agent, or Firm—Phillips, Lytle, Hitchcock, Blaine & Huber LLP

(57) ABSTRACT

A sensor for determining the location of the surface of liquid in a container, includes: a hollow tubular stainless steel probe inserted into said container, said probe having one portion arranged above the surface of the liquid and having another portion submerged in the liquid; a first thermocouple operatively arranged within the probe to sense the temperature above the liquid surface; a second thermocouple operatively arranged within the probe to sense the temperature of said liquid at a point beneath the liquid surface; a resistance wire operatively arranged within the probe; a current source operatively arranged to apply a constant-current to the ends of the wire; and an ohmmeter for measuring the electrical resistance of the wire according to the equation:

$$R_T = f[k_a T_a H h + k_w T_w H(1-h)]$$

where $R_T$ is the resistance of the wire, $f$ is the symbol for "a function of", $k_a$ is a constant for the probe first portion, $T_a$ is the temperature sensed by the first temperature sensor, $k_w$ is a constant for the probe second portion, $T_w$ is the temperature sensed by said second temperature sensor, H is the vertical distance between said first and second temperature sensors, and h is the distance from said first temperature sensor to said liquid surface; whereby the liquid level may be indicated by the value of h.

7 Claims, 1 Drawing Sheet

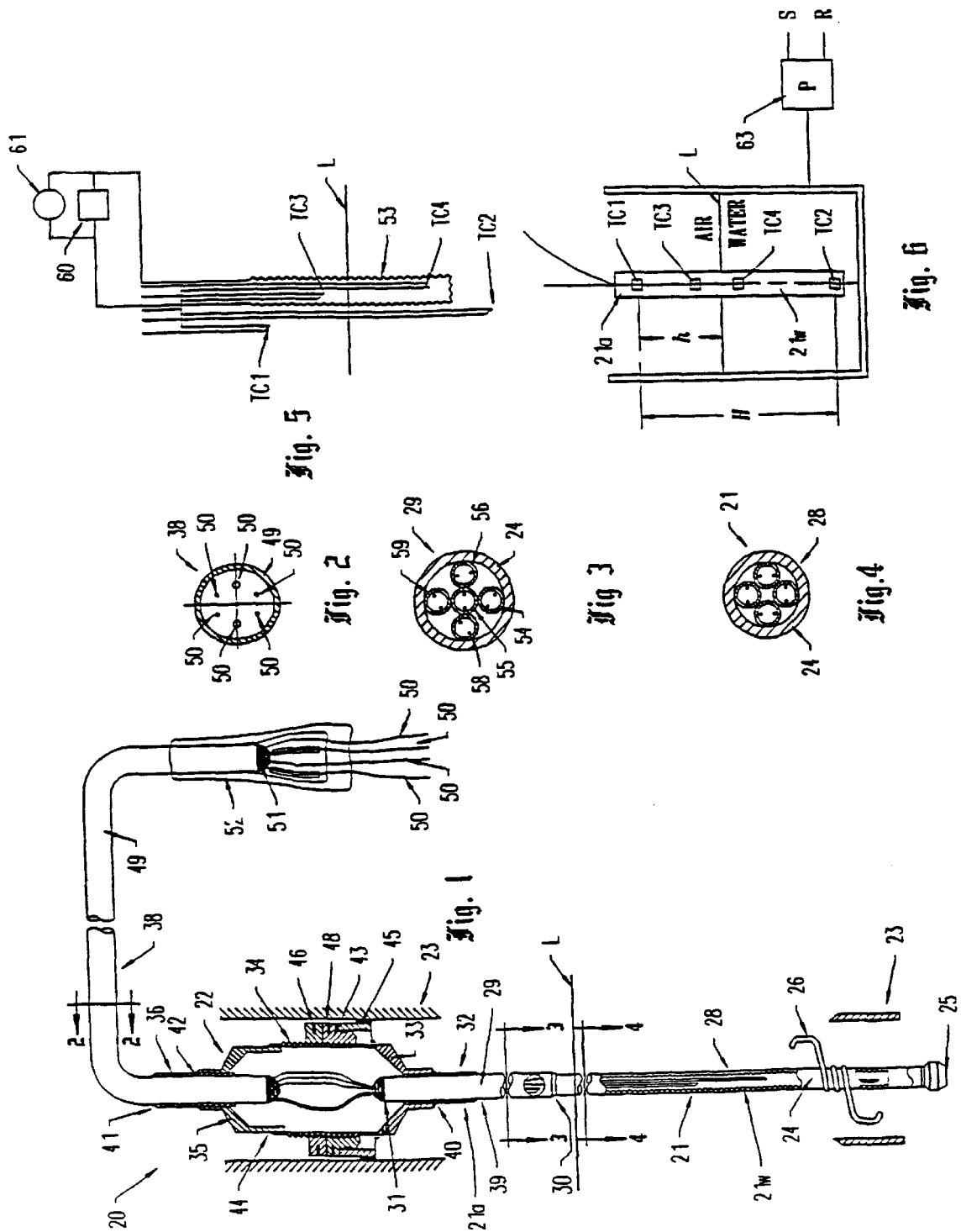

ANALOG LIQUID LEVEL SENSOR

TECHNICAL FIELD

The present invention relates generally to the field of liquid level sensors, and, more particularly, to an improved sensor for determining, on an analog basis, the location of the surface of liquid in a container.

BACKGROUND ART

It is sometimes desirable to know the specific level of a liquid in a tank or container. Many different techniques have been developed to accomplish this objective. Some are mechanical, as by determining the level of the liquid from a wetted dip stick; some are optical; and still others are electrical.

U.S. Pat. No. 3,898,638 discloses a differential temperature sensor in which a heated electrode 16 is located at different distances from two sensing probes. If fluid flows through the conduit in which the probes are mounted, the two sensors do not sense an appreciable temperature differential therebetween. On the other hand, if the flow through the conduit stops, then the sensing probes will discern a differential change in the electrical resistivity of the sensing probes.

U.S. Pat. No. 4,449,403 discloses a guide tube-inserted liquid level sensor. This device as a chain of series-connected resistance temperature devices ("RTDs") to measure the temperature gradient within a guide tube. As shown in FIG. 2 of this reference, there are two RTDs, indicated at 29 and 38. One RTD is heated by a proximate heater 30. The sensors are wetted. Boiling and void conditions are sensed by the difference in resistance of the RTDs.

U.S. Pat. No. 4,532,799 discloses a liquid level sensor having a probe that is adapted to be inserted into a container having a liquid therein. A resistance wire is helically wound on a core within a heating element. More heat is carried away by the vapor than by the liquid. Hence, the electrical resistance of the entire length of wire (i.e., the resistance of the portion in the vapor and the resistance of the portion in the liquid) will provide an analog signal indicative of the change in liquid level. However, upon information and belief, it is critically important to know the temperature of the air and the temperature of the liquid in order to determine the particular level of liquid. In other words, the device shown in the '799 patent appears to be useful in showing a change of liquid level, but not indicating the absolute analog value of the liquid level itself.

Finally, U.S. Pat. No. 5,210,769 discloses a liquid level measuring system for a vehicle. Basically, the fluid levels are determined as a function of the electrical resistance of a positive temperature coefficient conductor, part of which is wetted and part of which is not. This patent discloses that such sensors may be used to determine the level of engine oil, coolant, windshield washer fluid, transmission fluid, and fluid in a differential.

Accordingly, it would be generally desirable to provide an improved resistance-type sensor that can be used to determine the absolute level, as opposed to a change in level, of a liquid within a container on an analog basis.

DISCLOSURE OF THE INVENTION

With parenthetical reference to the corresponding parts, portions or surfaces of the disclosed embodiment, merely for purposes of illustration and not be way of limitation, the present invention broadly provides an improved sensor (20) for determining, by electrical means, the analog location of the surface of a liquid in a container.

The improved sensor broadly includes: a probe (21) inserted into the container, the probe having one portion (21a) arranged above the surface of the liquid and having another portion (21w) submerged in the liquid; a first temperature sensor (TC1), operatively arranged within the probe to sense the temperature above the liquid surface; a second temperature sensor (TC2) operatively arranged within the probe to sense the temperature of the liquid at a point beneath the surface; a resistance wire (53) operatively arranged within the probe; a current source (60) operatively arranged to apply a current to the ends of the wire; and detector means (61) for measuring the resistance of the wire according to the equation:

$$R_T = f[k_a T_a H h + k_w T_w H (1-h)]$$

where $R_T$ is the resistance of the wire, $f$ is the symbol for "a function of", $k_a$ is a constant for the probe first portion, $T_a$ is the temperature sensed by the first temperature sensor, $k_w$ is a constant for the probe second portion, $T_w$ is the temperature sensed by the second temperature sensor, H is the vertical distance between the first and second temperature sensors (i.e., the maximum range of measurement), h is the distance from the first temperature sensor to the liquid surface, V is the voltage sensed by said voltmeter, and i is the current in said wire—, change "whereby" to—such that—, and insert immediately before the period—when the liquid level is between said first and second sensors, but will be indicated by a first constant value if the second temperature sensor is above said liquid surface and will be indicated by a second constant value if the first temperature sensor is arranged beneath said liquid surface; whereby the liquid level may be indicated by the value of h.

In the preferred embodiment, the current source is arranged to apply a constant current to the ends of the wire, and each of the temperature sensors is a thermocouple. The probe may be an elongated tube formed of stainless steel and suitably closed at both ends. This probe may extend upwardly into the container by penetrating the bottom thereof, or may hang or depend into the container from above. The improved sensor may further include a third thermocouple (TC3) arranged within the probe above the liquid surface and a fourth thermocouple (TC4) arranged within the probe below the liquid surface, and a pump (63) associated with a source of liquid, wherein the third and fourth temperature sensors are arranged between the first and second temperature sensors, and wherein the third and fourth thermocouples are arranged to control the operation of the pump or valve to maintain the liquid level between said third and fourth thermocouples.

Accordingly, the general object of the present invention is to provide an improved sensor for determining the location of the surface of a liquid in a container.

Another object is to provide an improved liquid level sensor which determines by electrical means the analog value of the liquid level within a container.

Another object is to provide an improved liquid level sensor that is capable of determining the level of a liquid surface from within a protected environment.

These and other objects and advantages will become apparent from the foregoing and ongoing written specification, the drawings, and the appended claims.

BRIEF DESCRIPTION OF THE DRAWINGS

FIG. 1 is a fragmentary view, partly in section and partly in elevation, of the improved sensor, showing the improved probe as depending into a container partially filled with liquid.

FIG. 2 is a fragmentary transverse vertical sectional view thereof, taken generally on line 2—2 of FIG. 1.

FIG. 3 is a fragmentary transverse horizontal sectional view thereof, taken generally on line 3—3 of FIG. 1.

FIG. 4 is a fragmentary transverse horizontal sectional view thereof, taken generally on line 4—4 of FIG. 1.

FIG. 5 is a schematic view showing the four thermocouples and the resistance wire.

FIG. 6 is a schematic view showing a depending probe as being partially submerged in liquid, and indicating the liquid level in terms of the distance h from the uppermost thermocouple.

DESCRIPTION OF THE PREFERRED EMBODIMENT(S)

At the outset, it should be clearly understood that like reference numerals are intended to identify the same structural elements, portions or surfaces consistently throughout the several drawing figures, as such elements, portions or surfaces may be further described or explained by the entire written specification of which this detailed description is an integral part. Unless otherwise indicated, the drawings are intended to be read (e.g., arrangement of parts, mounting, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.) simply refer to the orientation of the illustrated structure as the particular drawing figure faces the reader. Unless otherwise indicated, the terms "inwardly" and "outwardly" refer to the orientation of a surface relative to its axis of elongation, or axis or rotation, as appropriate.

Referring now to the drawings, and, more particularly, to FIG. 1 thereof, the present invention broadly provides an improved analog liquid level sensor, of which the presently-preferred embodiment is generally indicated at 20. The improved device is shown as broadly including a probe, generally indicated at 21, that is supported at its upper end by a head, generally indicated at 22, and that depends or hangs downwardly into a container, portions of which are indicated at 23, containing a liquid L. In the following description, the liquid will be described as being water, although it could be some other liquid. The space above the surface of the liquid is occupied by air or some other gas at room temperature or at temperatures up to about 200° C. The submerged portion of the probe is indicated at 21w, and the supplementary dry portion above the liquid is indicated at 21a. There will normally exist a temperature differential between the temperature of the air and the temperature of the liquid in the container 23.

Referring now to FIGS. 1, 3 and 4, the probe is shown as being an outermost vertically-elongated tubular member having a thin-walled outermost stainless steel sheath 24. At its lower end, the probe is closed by a hermetically-sealed bulb-like end 25. Still referring to FIG. 1, a guide or spacer 26 is formed by wrapping several convolutions of a length of stainless steel wire about the outer surface of probe 24. The function of these spacers, which may be positioned at about two meter intervals along the axial length of the probe, is to prevent the probe sleeve from contacting the walls of the container. In other words, the spacers hold and maintain the probe in a generally-centered position within the cylindrical container. More particularly, the probe is shown as having a lower cylindrical part 28 and an upper cylindrical part 29, with the joint therebetween being closed by a suitable peripheral weldment 30. Parts 28 and 29 may be formed separately and subsequently assembled, or may be formed integrally, as desired. Members 28 and 29 are both formed of stainless steel and are open-ended tubular members. As previously indicated, the lower end of tube 28 is closed by bulb-like end 25, which is welded to the tube to hermetically seal the lower end. The upper end of tube 29 is closed by a suitable potting compound, generally indicated at 31.

The probe head 22 is shown as being a specially-configured member that consists of a number of parts that are suitably assembled together. More particular, the probe head is shown as including a vertically-elongated thin-walled cylindrical tube 32 adapted to embrace the upper margin of probe upper tube 29, a member 33 having a lower portion encircling the upper margin of tube 32 and having an enlarged-diameter upper portion continuing upwardly therefrom, this enlarged portion being externally threaded, as indicated at 34; an upper portion 35 having a diametrically-enlarged portion that is telescopically received within the upper marginal end portion of member 34, a vertically-disposed thin-walled cylindrical tube 36 arranged to engage the margin of a metal-shielded mineral insulated cable 38. The upper margin of member 35 surrounds the lower margin of tube 36. All of the various parts of the probe head may be conveniently formed of a suitable metal, such as stainless steel. The various parts are connected to one another by various peripheral weldments. For example, the lower end of tube 32 is secured to tube 28 by a weldment 39; the lower end of member 33 is secured to an intermediate portion of tube 32 by a weldment 40; the upper end of tube 36 is secured to sheathed cable 38 by a weldment 41; and the upper end of member 35 is secured to an intermediate portion of tube 36 by peripheral weldment 42. The chamber formed within the enlarged-diameter portions of members 33, 35 is filled with a suitable insulating material, such as alumina powder and dry gas. These two members are sealed together by a peripheral weldment 44.

Still referring principally to FIG. 1, a concentric inner protection tube, generally indicated at 45, may be suitably secured within the outer containment. Two nut-like members, indicated at 46 and 48, respectively, may be threaded onto the outer surface of head member 33 and may rest against the annular horizontal upper end of inner protection tube 45. The position of these nut-like members on member 33 may be adjusted to vary the position of the tube within the protection tube.

Sheathed cable 35 is shown as extending between a right marginal end portion and a left marginal end portion positioned within probe head 22. As shown in FIGS. 1 and 2, cable 38 is sheathed within a thin-walled tubular stainless steel jacket 49. This member conveys a number of conductors, severally indicated at 50, within a mineral insulation. In the preferred embodiment, the mineral insulation is magnesium oxide, and there are two copper cores, four chromel cores and one alumel core. The right marginal end portion of cable 38 is closed by a suitable epoxy, generally indicated at 51, and the penetrant conductors are sheathed within a heat shrinkable plastic coating 52. Conductors 50 are adapted to be connected to a suitable current source and ohmmeter, for a purpose hereinafter apparent.

Referring now to FIGS. 1 and 3–5, the probe carries within it four thermocouples and a resistance wire. As best shown in FIG. 5, these thermocouples are indicated at TC1, TC2, TC3 and TC4, respectively. Moreover, an electrical resistance wire 53 extends downwardly into the probe. The lower distal loop of wire 53 is consistent with thermocouple TC2.

As shown in FIG. 3, the heater wire is conveyed via a conductor 54, and thermocouples TC1, TC2, TC3 and TC4 are conveyed by conductors 55, 56, 58 and 59, respectively. Each of these conductors is conveyed within a stainless steel sheathed cable.

As shown in FIG. 4, beneath upper thermocouple TC1, the device carries the leads for the heater and the three lower thermocouples.

The vertical positions of the thermocouples are shown in FIG. 5. It is noted that these four thermocouples are identified, in order of descent, is TC1, TC3, TC4 and TC2, respectively. Thus, thermocouple TC1 is the uppermost thermocouple, and thermocouple TC2 is the lower most thermocouple.

Still referring principally to FIG. 5, a source 60 supplies constant-current to resistance wire 53. The voltage drop across the current source is sensed by a voltmeter 61. Thermocouple TC1 is arranged to sense the temperature within the probe above the liquid level. Conversely, thermocouple TC2 is arranged to sense the temperature within the probe at a point beneath the liquid level. These two temperatures must be known in order to properly calculate the electrical resistance as a function of the relative lengths of the portions of the resistance wire that are wetted and dry. In fact, this function may be expressed by the equation:

$$R_T = f[k_a T_a H h + k_w T_w H(1-h)] = V/i$$

where $R_T$ is the resistance of said wire, $f$ is the symbol for "a function of", $k_a$ is a constant for the probe dry or first portion, $T_a$ is the temperature sensed by the first temperature sensor TC1, $k_w$ is a constant for the probe wet or second portion, $T_w$ is the temperature sensed by the second temperature sensor (TC2), H is the vertical distance between temperature sensors TC1 TC4 (i.e., the maximum range of measurement), and h is the vertical distance from uppermost temperature sensor TC1 to the liquid surface L, V is the voltage sensed by said voltmeter, and i is the current in said wire; such that the liquid level may be indicated by the value of h when the liquid level is between said first and second sensors, but will be indicated by a first constant value if the second temperature sensor is above said liquid surface and will be indicated by a second constant value if the first temperature sensor is arranged beneath said liquid surface.

The intermediate thermocouples TC3 and TC4 are not used to directly measure the liquid level. Rather, these thermocouples are used to operate a pump or valve, indicated at 63 in FIG. 6, that is connected to a fluid source S and a fluid return R. In other words, the thermocouples TC3 and TC4 are used to operate pump or valve 63 to maintain the liquid level between these two thermocouples.

Modifications

The present invention contemplates that many changes and modifications may be made. For example, the probe may extend upwardly into a container from the bottom thereof, or may extend downwardly into the container from above. The liquid/gas may be water/air, or some other combination of fluids. Temperature sensors TC3 and TC4 are optional. The probe may have the construction shown, or may have some other configuration. Spacers 26, while desirable, are optional. Similarly, the temperature sensing devices may be thermocouples or some other type of device. The exact type and nature of the resistance wire may be changed, as desired.

Therefore, while the presently-preferred form of the improved liquid level sensor has been shown and described, and several modifications thereof discussed, persons skilled in this art will readily appreciate that various additional changes and modifications may be made without departing from the spirit of the invention, as defined and differentiated by the following claims.

What is claimed is:

1. A sensor for determining the analog location of the surface of liquid in a container, comprising:

an elongated probe inserted into said container, said probe having one portion arranged above the surface of said liquid and having another portion submerged in said liquid;

a first temperature sensor operatively arranged within said probe adjacent the upper end thereof to sense the temperature above said liquid surface;

a second temperature sensor operatively arranged within said probe adjacent the lower end thereof to sense the temperature of said liquid at a point beneath said surface;

a resistance wire operatively arranged within said probe;

a current source operatively arranged to supply a current to said wire; and a voltmeter arranged to measure the voltage drop across said wire;

wherein the resistance of said wire may be calculated according to the equation:

$$R_T = f[k_a T_a H h + k_w T_w H(1-h)] = V/i$$

where $R_T$ is the resistance of said wire, $f$ is the symbol for "a function of", $k_a$ is a constant for the probe first portion, $T_a$ is the temperature sensed by the first temperature sensor, $k_w$ is a constant for the probe second portion, $T_w$ is the temperature sensed by said second temperature sensor, H is the vertical distance between said first and second temperature sensors, h is the distance from said first temperature sensor to said liquid surface, and V is the voltage sensed by said voltmeter, and i is the current in said wire;

such that the liquid level may be indicated by the value of h when the liquid level is between said first and second sensors, but will be indicated by a first constant value if the second temperature sensor is above said liquid surface and will be indicated by a second constant value if the first temperature sensor is arranged beneath said liquid surface.

2. A sensor as set forth in claim 1 wherein said current source is arranged to apply a constant current to the ends of said wire.

3. A sensor as set forth in claim 1 wherein said first temperature sensor is a thermocouple.

4. A sensor as set forth in claim 1 wherein said second temperature sensor is a thermocouple.

5. A sensor as set forth in claim 1 wherein said probe is an elongated closed tube formed of stainless steel.

6. A sensor as set forth in claim 1 wherein said probe depends into said container such that the bottom of said probe is submerging in said liquid.

7. A sensor as set forth in claim 1 and further comprising a third temperature sensor arranged within said probe above said liquid surface and a fourth temperature sensor arranged within said probe below said liquid surface, and a pump or valve associated with a source of liquid, wherein said third and fourth temperature sensors are arranged between said first and second temperature sensors, and wherein said third and fourth sensors are arranged to control the operation of said pump or valve to maintain the liquid level between said third and fourth sensors.

* * * * *